United States Patent [19]
Matsushita et al.

[11] Patent Number: 5,650,591
[45] Date of Patent: Jul. 22, 1997

[54] WATERPROOF CASING

[75] Inventors: Yasuo Matsushita; Tatsuya Sumida, both of Mie-ken, Japan

[73] Assignee: Sumitomo Wiring Systems, Ltd., Yokkaichi, Japan

[21] Appl. No.: 741,707

[22] Filed: Oct. 31, 1996

Related U.S. Application Data

[63] Continuation of Ser. No. 194,913, Feb. 14, 1994, abandoned.

[30] Foreign Application Priority Data

Feb. 12, 1993 [JP] Japan ................................ 5-009565 U

[51] Int. Cl.[6] ........................................................ H05K 5/03
[52] U.S. Cl. ............................ 174/17 VA; 174/17 CT; 174/50
[58] Field of Search ........................ 174/50, 50.52, 174/52.1, 59, 65 R, 17 VA, 17 CT; 439/76.1, 76.2, 54, 936

[56] References Cited

U.S. PATENT DOCUMENTS

| | | | |
|---|---|---|---|
| 3,987,258 | 10/1976 | Tsutusui et al. | 179/179 |
| 4,709,123 | 11/1987 | Yamashita et al. | 174/17 VA X |
| 4,772,759 | 9/1988 | Roy et al. | 174/17 VA |
| 4,936,787 | 6/1990 | Klein et al. | 439/76.1 |
| 4,975,545 | 12/1990 | China et al. | 174/52.1 |
| 5,233,377 | 8/1993 | Kosako | 354/64 |
| 5,264,661 | 11/1993 | Luettgen | 174/52.1 X |
| 5,305,145 | 4/1994 | Tanaka | 359/513 |
| 5,334,799 | 8/1994 | Naito et al. | 174/17 VA |

FOREIGN PATENT DOCUMENTS

| | | | |
|---|---|---|---|
| 0326812 | 8/1989 | European Pat. Off. | 174/17 VA X |
| 0377066 | 7/1990 | European Pat. Off. | |
| 0496941 | 8/1992 | European Pat. Off. | |
| 2448378 | 5/1976 | Germany | 174/17 VA X |
| 56-112978 | 8/1981 | Japan | H05K 5/02 |
| 57-186094 | 11/1982 | Japan | H05K 7/20 |
| 5160579 | 6/1993 | Japan | 174/17 VA X |
| 8809422 | 12/1988 | WIPO | |

OTHER PUBLICATIONS

"Water Impervious Vent for Electrical and Similar Equipment," *Research Disclosure*, No. 275, p. 149 Mar. 1987, New York, NY, US.

*Primary Examiner*—Kristine L. Kincaid
*Assistant Examiner*—Dean A. Reichard
*Attorney, Agent, or Firm*—Sughrue, Mion, Zinn, Macpeak & Seas

[57] ABSTRACT

This invention aims to provide a waterproof casing which can keep its waterproof function under a great change of temperature. In the waterproof casing, a lid (20) which covers an opening in a body (10) is provided with a pipe (24) which intercommunicates an interior and an exterior of the casing. A porous waterproof filter (25) closes a port (24a) in the pipe (24). Air in the body (10) is expanded and contracted under changes in temperature. However, only air can pass through the filter (25) into and out of the body (10) with water being precluded, thereby waterproofing the interior of the casing.

3 Claims, 4 Drawing Sheets

5,650,591

WATERPROOF CASING

This is a continuation of application Ser. No. 08/194,913 filed Feb. 14, 1994, now abandoned.

BACKGROUND OF THE INVENTION

1. Field of the Invention

This invention relates to a waterproof casing and more particularly to a waterproof casing suitable for accommodating an electronic unit in an engine compartment in a vehicle.

2. Statement of the Prior Art

In the case of accommodating in a casing a device which must be waterproofed, a casing having a simple box like construction is unable to effect waterproofing of the device under an environment where the ambient temperature is subject to rapid changes. Since a pressure within the casing changes in response to a temperature change, the casing is deformed and water enters into the interior of the casing through clearances between a body and a cover for sealing the interior of the casing.

Heretofore, some waterproof casings which are used under such circumstances are known by Japanese Utility Model Public Disclosure Nos. 56-112978 (1981) and 57-186094 (1982). These casings are not formed into a sealed construction but they are provided with a vent hole in order to equalize the pressure in the interior and exterior of the casing. One casing disclosed in the former reference is provided with a labyrinth vent hole which retains water entering thereinto, while another casing disclosed in the latter reference is provided with a zigzag vent hole in which baffle boards are arranged in a zigzag manner in order to prevent water from entering into the interior of the casing.

One example of such a waterproof casing is that which may be used to protect an electronic control device for an engine from contamination with water when the device is disposed in an engine compartment. In such an engine compartment, the waterproof casing is subject to high temperatures generated by the engine and low temperatures from water which enters into the compartment during driving. In this case, the conventional waterproof casings have the following problems.

In the former casing the labyrinth vent hole can not hold a large amount of water while the zigzag vent hole in the latter casing can not baffle a high pressure of water.

SUMMARY OF THE INVENTION

An object of the present invention is to provide a waterproof casing which can maintain an effective waterproofing function under a circumstance in which an ambient temperature is rapidly changed.

In order to achieve the above object, a waterproof casing which accommodates a device to be waterproofed 1s characterized in that a communication hole is formed on a wall constituting said casing and that said communication hole is closed by means of a porous waterproof filter.

In the waterproof casing of the present invention, when air in the casing is expanded and contracted by a change in ambient temperature, air passes into and out of the casing through a communication hole closed by a porous waterproof filter and any difference between internal and external pressures with respect to the casing is canceled. Even if external air is drawn through the communication hole into the casing when the internal pressure in the casing is lowered and water is applied to the communication hole at that time, the porous waterproof filter prevents water from passing into the casing but passes air thereinto.

As described above, the present invention provides a waterproof casing which can pass air, which precludes water from entering, and which can maintain its waterproofing ability even in an environment subject to great changes in temperature.

DETAILED DESCRIPTION OF THE PREFERRED EMBODIMENTS

Referring now to FIGS. 1 to 4, embodiments of a waterproof casing of the present invention are described below.

Figure 1:
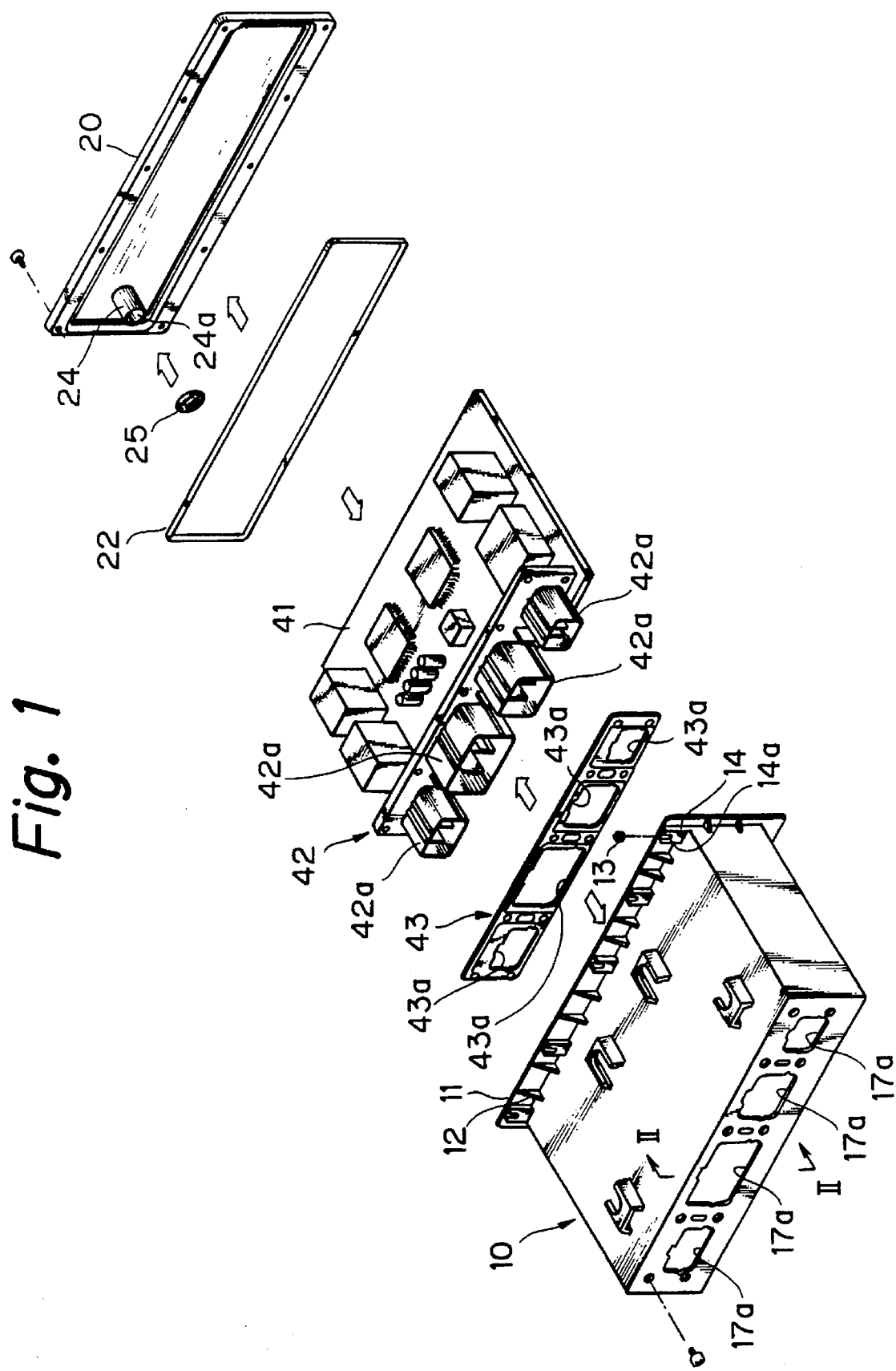
FIG. 1 is an exploded perspective view of an embodiment of a waterproof casing of the present invention.
Figure 2:
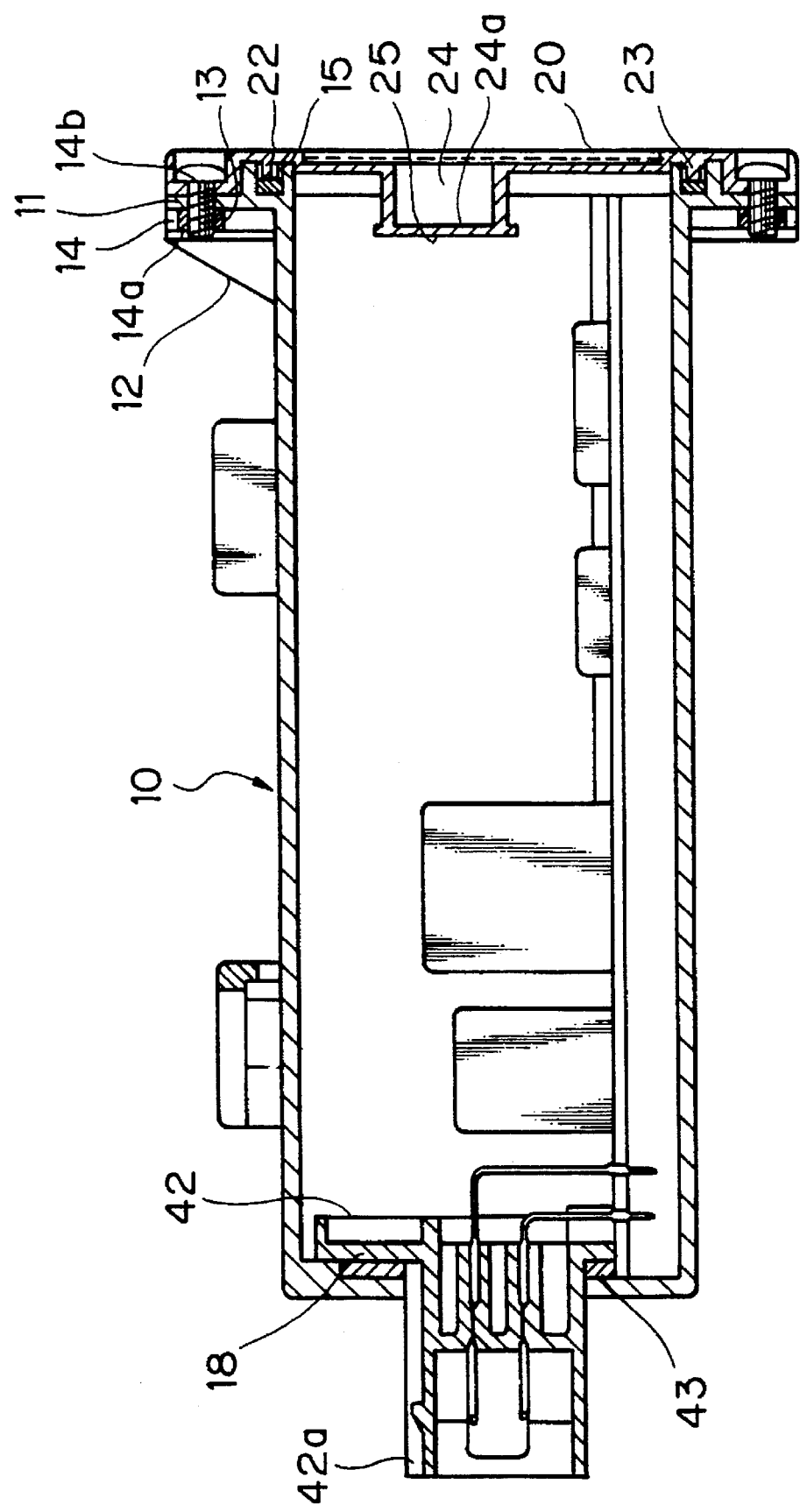
FIG. 2 is a cross sectional view taken along lines II—II in FIG. 1

FIG. 1 is an exploded perspective view of an embodiment of a waterproof casing of the present invention and FIG. 2 is a cross sectional view taken along lines II—II in FIG. 1.

As shown in FIGS. 1 and 2, the waterproof casing comprises a box like body 10 and a cover 20 which covers an opening at the rear side of the body 10. The box like body 10 is provided on a periphery of the opening with a flange 11 and on a front side of the flange 11 with a plurality of ribs 12 which serve to reinforce the flange 11. The flange 11 is provided on its front side face with nut-holding pockets 14 which are formed to receive hexagon nuts 13 so that the nuts 13 can not rotate.

The nut-holding pocket 14 is provided on its front side with a U-shaped groove 14a and on its rear side with a threaded hole 14b having the same internal thread as that of the nut 13 to form a continuous threaded hole. On the other hand, the flange 11 is provided on its rear side face with a peripheral groove 15 which is formed around the opening in the body 10 and receives a rubber packing 22 for sealing.

The lid 20 has a width sufficient to confront the entire surface of the flange 11 as well as the opening in the body 10. The lid 20 is provided on its front side face with a peripheral projection 23 in opposition to the peripheral groove 15 in the flange 11. When the lid 20 is mounted on the flange 11, the peripheral projection 23 pushes the rubber packing 22 into the groove 15.

The lid 20 is provided with a pipe 24 which extends from a rear side face to a front side. A porous waterproof filter 25 is mounted on a port (communication hole) 24a of the pipe 24 at the body side. The filter 25 serves to pass air and preclude water from passing. Although the filter 25 is in the form of a membrane in this embodiment, it may be formed into a plate, a block or the like.

An electronic base plate 40 on which electronic elements are arranged is accommodated in the body 10. The electronic base plate 40 comprises a print substrate 41 on which electric elements are arranged and a connector member 42 having four connectors 42a which are connected vertically on a front end edge of the print substrate 41. On the other hand, the body 10 is provided at a front side end with apertures 17a through which the connectors 42a pass and extend outwardly. The rubber packing 43 having apertures 43a which accord with the apertures 17a is disposed between the connector member 42 and the body 10.

Next, a manner of using the waterproof casing of the embodiment of the present invention will be explained below.

Upon assembly, firstly the filter 25 is attached to the port 24a of the pipe 24 provided on the lid 20. The filter 25 is larger than a diameter of the port 24a. The filter 25 is attached to the port 24 by means of an adhesive applied around the port 24a or by heat-welding.

Secondly, after the connector member 42 is connected to the print substrate 41 to complete the electronic base plate 40, the rubber packing 43 is mounted on the connector member 42. Then, the electronic base plate 40 is inserted into the body 10 from the rear side and secured to the body by screws at the front side. Further, the rubber packing 22 is accommodated in the groove 15 in the flange 11 and the lid 20 covers the opening in the body 10 so that the projection 23 pushes the rubber packing 22.

After covering the opening with the lid 20, the hexagon nuts 13 are inserted into the nut-holding pockets 14 and the lid 20 is secured to the body 10 by screws at the rear side. As described above, since the nut-holding pockets 14 holds the hexagon nuts 13 unrotatably, it is not necessary to clamp the nuts 13 with fingers while turning the screws, thereby improving work.

Since the engine compartment is at a high temperature due to a heat from the engine and the waterproof casing is subject to a heat from electronic circuit elements, the waterproof casing is heated to a high temperature and air in the casing tends to expand due to the high temperature. This results in a difference of pressure between the interior and exterior of the casing. Since the filter 25 serves to pass air, air under a high pressure in the body 10 is exhausted through the filter 25 to the exterior of the casing.

At this time, when the body 10 is watered from the outside, the body 10 is abruptly cooled from its exterior, air in the casing tends to contract, and this results in suction of external air through the pipe 24. Even if the pipe 24 is watered, water can not pass through the filter 25, and thus the interior of the body 10 is not watered. Also, since the flange 11 connected to the lid 20 is reinforced by the ribs, the body 10 is not deformed by a change in temperature. Accordingly, water does not enter into the casing through clearances caused by deformation.

Although the filter 25 closes the port 24a in the lid 20 in the embodiment described above, the filter 25 may close an opening formed in the body 10.

Figure 3:
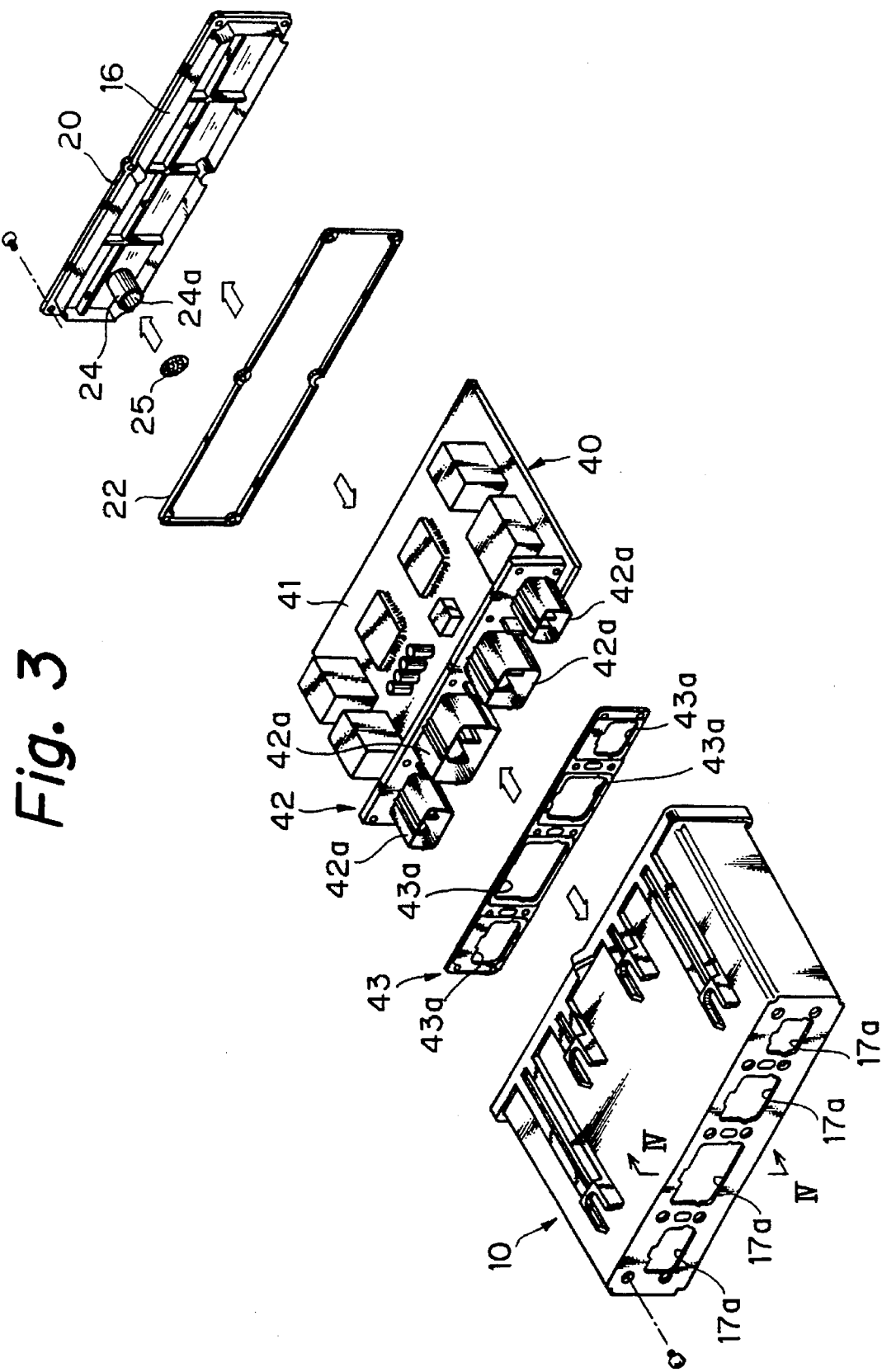
FIG. 3 is an exploded perspective view of another embodiment of the waterproof casing of FIG. 1.
Figure 4:
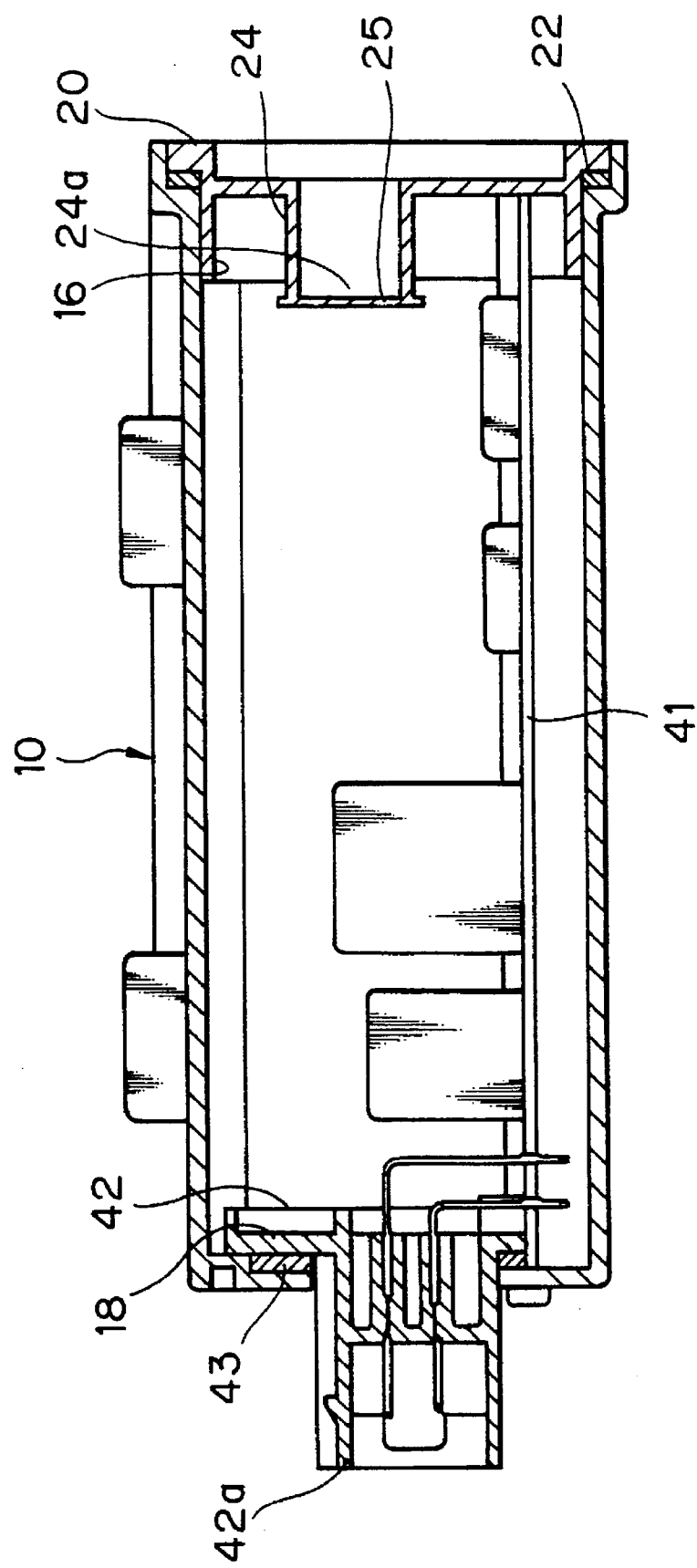
FIG. 4 is a cross sectional view taken along lines IV—IV in FIG. 3.

FIG. 3 is an exploded perspective view of another embodiment of the present invention and FIG. 4 is a cross sectional view taken along lines IV—IV in FIG. 3.

The second embodiment is differed from the first embodiment in that the lid 20 is provided with a support wall 16, which projects toward the opening in the body 10, instead of the flange 11 provided on the body 10.

When the lid 20 is mounted on the body 10, the support wall 16 closely contacts with an inner peripheral wall in the opening. The support wall 16 serves to prevent the opening portion of the body from being deformed due to changes in temperature.

What is claimed is:

1. A waterproof casing which accommodates an electronic unit to be waterproofed, said casing comprising a box like body having an opening and a lid for covering said opening in said body, said lid comprising a communication hole closed with a porous waterproof filter, said lid being provided with a pipe which extends into the interior of the body to form said communication hole, said body further comprising apertures for accommodating connectors of the electronic unit to pass and extend outwardly through said body.

2. A water proof casing according to claim 1, wherein said casing is suitable for accommodating said electronic unit to be waterproofed in an engine compartment in a vehicle, and wherein a flange is provided on said body around said opening.

3. A water proof casing according to claim 1, wherein said lid is provided with a support wall which projects toward said opening.

* * * * *